United States Patent
Litwinowicz et al.

(10) Patent No.: US 9,156,540 B2
(45) Date of Patent: Oct. 13, 2015

(54) HARD LANDING DETECTION AND ORIENTATION CONTROL

(71) Applicant: Sikorsky Aircraft Corporation, Stratford, CT (US)

(72) Inventors: Anthony Litwinowicz, Derby, CT (US); Vineet Sahasrabudhe, Cheshire, CT (US); Charles W. Clarke, Sag Harbor, NY (US)

(73) Assignee: SIKORSKY AIRCRAFT CORPORATION, Stratford, CT (US)

( * ) Notice: Subject to any disclaimer, the term of this patent is extended or adjusted under 35 U.S.C. 154(b) by 14 days.

(21) Appl. No.: 13/954,369

(22) Filed: Jul. 30, 2013

(65) Prior Publication Data

US 2015/0039159 A1 Feb. 5, 2015

(51) Int. Cl.
*B64C 19/00* (2006.01)
*B64D 43/00* (2006.01)
*G05D 1/00* (2006.01)

(52) U.S. Cl.
CPC .............. *B64C 19/00* (2013.01); *B64D 43/00* (2013.01); *G05D 1/0055* (2013.01)

(58) Field of Classification Search
USPC ........................................ 701/3, 120, 122, 14
See application file for complete search history.

(56) References Cited

U.S. PATENT DOCUMENTS

| | | | |
|---|---|---|---|
| 5,928,300 A | 7/1999 | Rogers et al. | |
| 6,940,427 B2 | 9/2005 | Bateman | |
| 8,170,727 B2 * | 5/2012 | Deker | 701/3 |
| 2007/0008187 A1 * | 1/2007 | Schmidt | 340/970 |
| 2009/0157287 A1 * | 6/2009 | Shafaat et al. | 701/120 |
| 2010/0292871 A1 * | 11/2010 | Schultz et al. | 701/3 |
| 2011/0029161 A1 * | 2/2011 | Zufferey et al. | 701/4 |
| 2011/0046825 A1 * | 2/2011 | Lastere et al. | 701/16 |
| 2011/0077803 A1 * | 3/2011 | Dehais et al. | 701/12 |
| 2011/0272523 A1 * | 11/2011 | Uegaki | 244/100 A |
| 2012/0035842 A1 * | 2/2012 | Shafaat et al. | 701/120 |
| 2012/0101666 A1 * | 4/2012 | Hill et al. | 701/3 |
| 2012/0133545 A1 * | 5/2012 | Fagan et al. | 342/30 |
| 2013/0103233 A1 * | 4/2013 | Bourret et al. | 701/18 |
| 2013/0191016 A1 * | 7/2013 | Baillon et al. | 701/301 |
| 2014/0249738 A1 * | 9/2014 | Euteneuer et al. | 701/301 |

* cited by examiner

Primary Examiner — Hussein A. Elchanti
(74) Attorney, Agent, or Firm — Cantor Colburn LLP

(57) ABSTRACT

Embodiments of the disclosure are directed to obtaining, by a device, data associated with an aircraft, processing, by the device, the data, determining, by the device, that the aircraft is likely to impact an object with a probability greater than a threshold within a second threshold amount of time based on the processed data, and causing, by the device, a change in an orientation of the aircraft based on the determination.

12 Claims, 4 Drawing Sheets

HARD LANDING DETECTION AND ORIENTATION CONTROL

BACKGROUND

As a result of varying environments and missions aircraft have incurred crash landings with varying attitudes and velocities. Aircraft (e.g., rotorcraft) are designed to attenuate energy caused by impact when there are small lateral velocities. The ability for the airframe of the aircraft to attenuate energy decreases in conditions where there are skewed impact angles and substantial lateral velocities. Crashes have occurred with skewed impact angles and lateral velocities that exceed crash design specifications.

Airbags may be used to attenuate energy in the event of a crash or hard impact. For example, sensors may detect that a crash is occurring and deploy airbags internal to the aircraft. Airbags external to the aircraft may be deployed when a determination is made that impact is imminent and at a point before the impact occurs. To be effective, the external airbags need to be fully deployed before impact. Much like the airframe structure, the airbags are designed to attenuate energy resulting from level impacts with minimal lateral velocity.

Independent processing units and sensors are used to determine when a crash or impact is imminent, in order to engage airbags or other crash-related devices and systems. These processing units and sensors base their determinations or algorithms on various quantities, such as acceleration and velocity. The algorithms are susceptible to false triggers or false positives (e.g., declaring that a crash is imminent when in actuality it is not), such as when the aircraft is being flown over a building or going over an edge of a ship.

BRIEF SUMMARY

An embodiment of the disclosure is directed to a method comprising: obtaining, by a device, data associated with an aircraft, processing, by the device, the data, determining, by the device, that the aircraft is likely to impact an object with a probability greater than a threshold within a second threshold amount of time based on the processed data, and causing, by the device, a change in an orientation of the aircraft based on the determination.

An embodiment of the disclosure is directed to an apparatus comprising: at least one processor, and memory having instructions stored thereon that, when executed by the at least one processor, cause the apparatus to: process data associated with an aircraft, determine that the aircraft is likely to impact an object with a probability greater than a threshold within a second threshold amount of time based on the processed data, and cause a change in the orientation of the aircraft based on the determination.

An embodiment of the disclosure is directed to a system aboard an aircraft, comprising: sensors configured to generate state data associated with the aircraft, at least one monitoring system configured to generate health data associated with the aircraft, at least one control computer configured to generate command model data associated with the aircraft, and a processor configured to: process the state data, the health data, and the command model data, determine that the aircraft is likely to crash with a probability greater than a threshold within a second threshold amount of time based on the processed data, and cause a change in an orientation of the aircraft based on the determination.

Additional embodiments are described below.

BRIEF DESCRIPTION OF THE DRAWINGS

The present disclosure is illustrated by way of example and not limited in the accompanying figures in which like reference numerals indicate similar elements.

DETAILED DESCRIPTION

Figure 1:
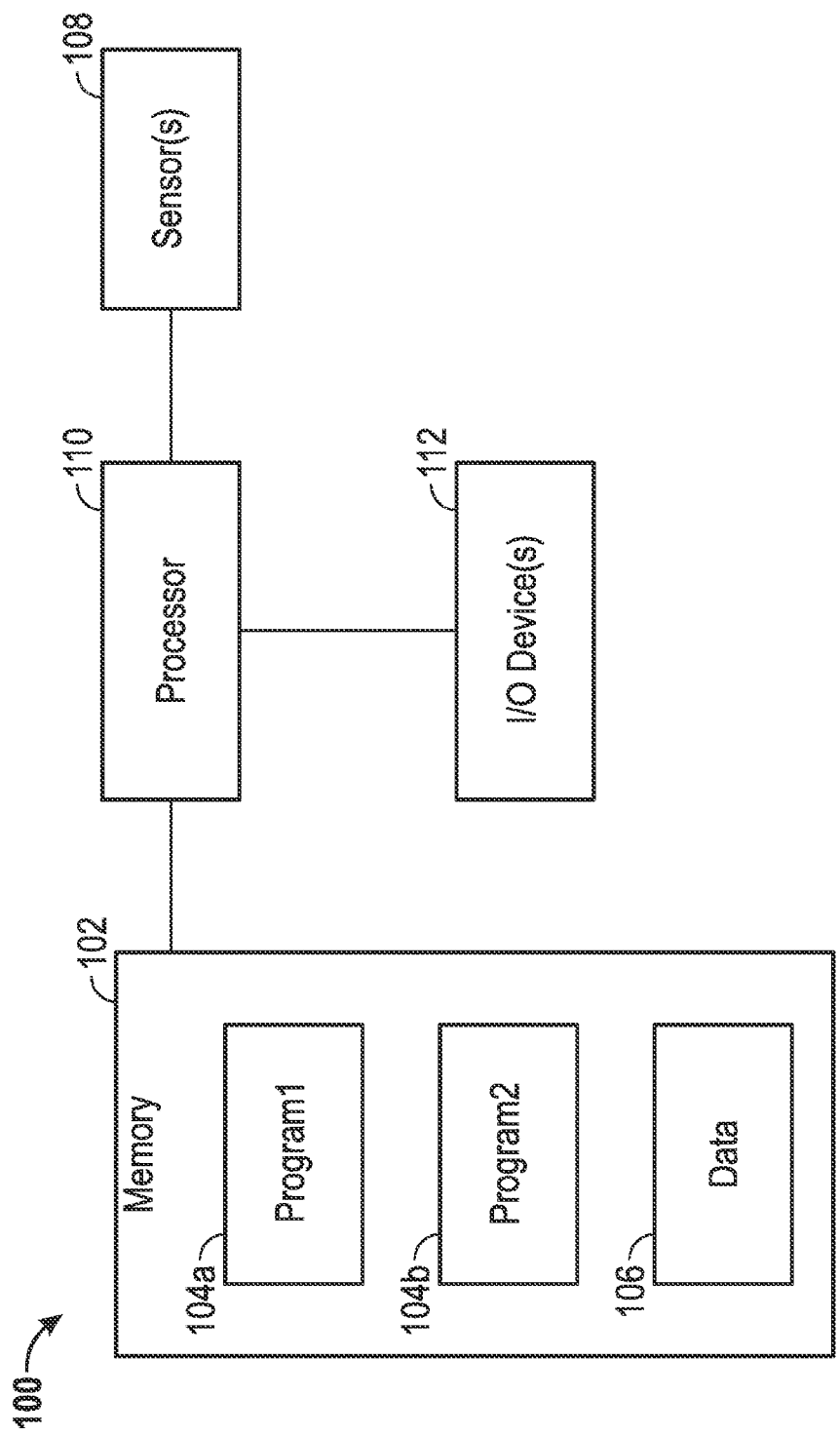
FIG. 1 is a schematic block diagram illustrating an exemplary computing system in accordance with one or more embodiments of this disclosure.

It is noted that various connections are set forth between elements in the following description and in the drawings (the contents of which are included in this disclosure by way of reference). It is noted that these connections in general and, unless specified otherwise, may be direct or indirect and that this specification is not intended to be limiting in this respect. In this respect, a coupling between entities may refer to either a direct or an indirect connection.

Exemplary embodiments of apparatuses, systems, and methods are described for determining that a crash or impact of an aircraft is imminent (e.g., that impact is imminent within a threshold amount of time). A suite of sensors already available on the aircraft may be used to measure proximity, velocities, or accelerations in order to detect that impact is imminent, thereby avoiding the need to introduce processors and sensors dedicated to crash detection. In some embodiments, existing sensors may be supplemented by additional sensors. One or more algorithms may use measurements of aircraft state data, aircraft health data or information, and/or inputs based on a command model. Once the algorithms make a determination that impact is imminent, the aircraft may be reoriented in terms of, e.g., attitude and velocities in order to optimize (e.g., maximize) energy attenuation.

Referring to FIG. 1, an exemplary computing system 100 is shown. The system 100 is shown as including a memory 102. The memory 102 may store executable instructions. The executable instructions may be stored or organized in any manner and at any level of abstraction, such as in connection with one or more processes, routines, methods, etc. As an example, at least a portion of the instructions are shown in FIG. 1 as being associated with a first program 104a and a second program 104b.

The memory 102 may be configured to store data 106. Data 106 may include data originating from one or more sources, such as one or more sensors 108.

The instructions stored in the memory 102 may be executed by one or more processors, such as a processor 110. The processor 110 may be configured to process data from the sensor(s) 108. The data from the sensor(s) 108 may be used to determine or detect that a crash or impact is imminent as described herein.

The processor 110 may be coupled to one or more input/output (I/O) devices 112. In some embodiments, the I/O device(s) 112 may include one or more of a keyboard or keypad, a touchscreen or touch panel, a display screen, a microphone, a speaker, a mouse, a button, a remote control, a joystick, a printer, etc. The I/O device(s) 112 may be configured to provide an interface to allow a user or another entity (e.g., another computing entity) to interact with the system 100.

The system 100 is illustrative. In some embodiments, one or more of the entities may be optional. In some embodiments, additional entities not shown may be included. For example, in some embodiments the system 100 may be associated with one or more networks. In some embodiments, the entities may be arranged or organized in a manner different from what is shown in FIG. 1. One or more of the entities shown in FIG. 1 may be associated with one or more of the devices or entities described herein.

Figure 2:
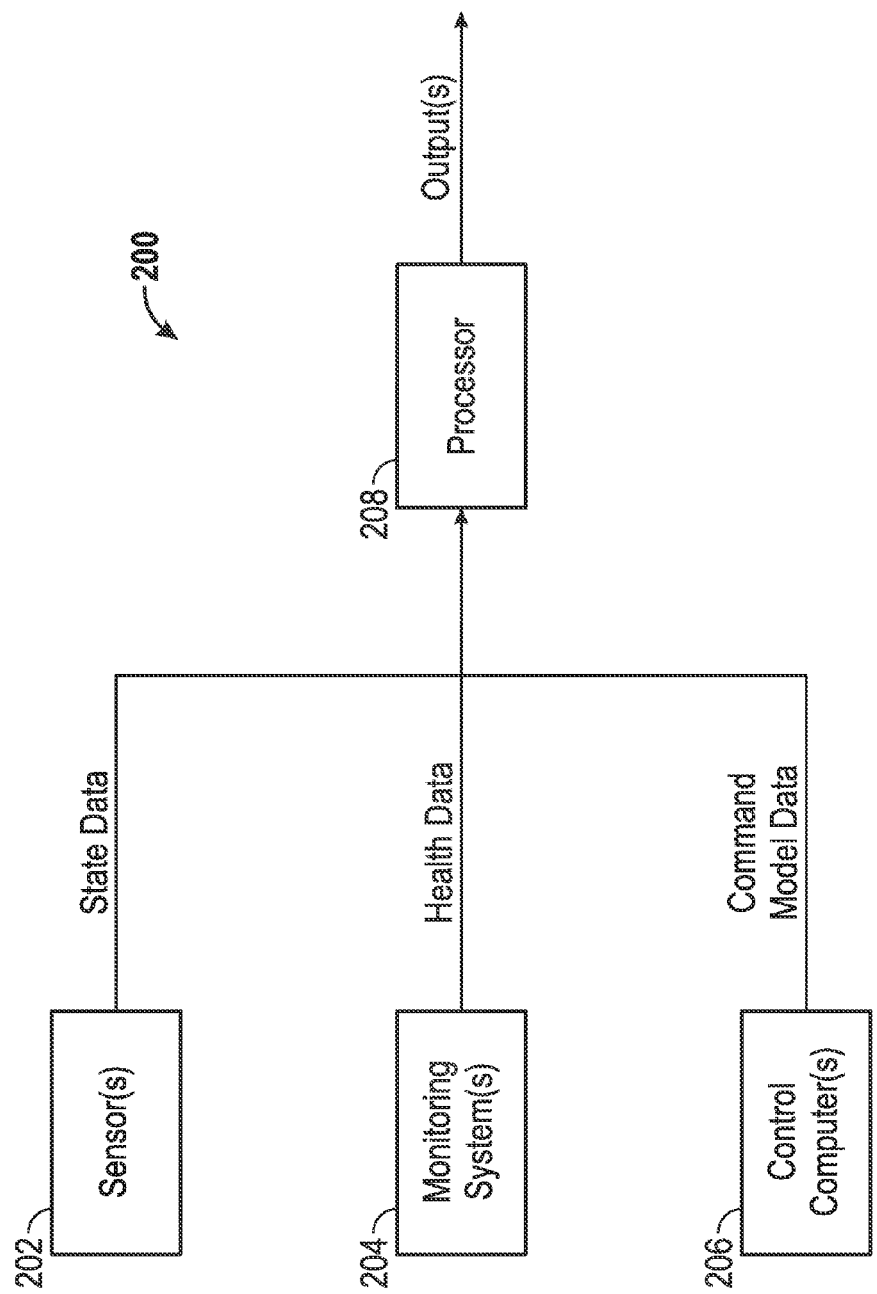
FIG. 2 illustrates a block diagram of a system for determining when an impact is imminent in accordance with one or more embodiments of this disclosure.

FIG. 2 illustrates a block diagram of a system 200 for determining when an impact is imminent in accordance with one or more embodiments. The system 200 may be implemented in connection with the system 100 of FIG. 1. The system 200 may be implemented on an aircraft.

As shown in FIG. 2, one or more sensors 202 may provide state data associated with an aircraft. The state data may include data associated with the acceleration, angular rates, attitudes, altitude, mass, fuel flow, and other data associated with the aircraft.

One or more monitoring systems 204 may provide health data associated with the aircraft. The health data may include an indication of whether there are any failed or inoperative sensors (e.g., sensors 202) or systems (e.g., fuel gauging systems, engine systems, etc.) aboard the aircraft.

One or more control computers 206 may provide command model data associated with the aircraft. The command model data may include data associated with input commands, such as input commands received from a pilot in a cockpit of the aircraft.

In some embodiments, the control computer(s) 206 may provide, or be associated with, controls that may regulate operation of one or more devices or components of the aircraft. For example, the controls may regulate air speed, attitude, acceleration, etc. The regulation provided by the controls may establish or modify an envelope associated with the operation or flight of the aircraft.

The data provided by the sensor(s) 202, the monitoring system(s) 204, and the control computer(s) 206 may be processed by one or more entities, such as a processor 208. Based on the processing of the data, the processor 208 may be configured to generate and provide one or more output(s). The output provided by the processor 208 may include an indication of whether an impact or crash is imminent. If a crash is imminent, the output indication may cause one or more energy attenuation systems (e.g., airbags) to deploy or engage. Furthermore, if a crash is imminent, the output indication may cause an adjustment of the orientation of the aircraft. For example, stick commands may be generated to reorient the aircraft to an optimal terminal attitude (potentially relative to one or more axes of the aircraft) and minimize or reduce (e.g., in an amount less than a threshold) velocities (e.g., lateral velocities) before impact.

Figure 3:
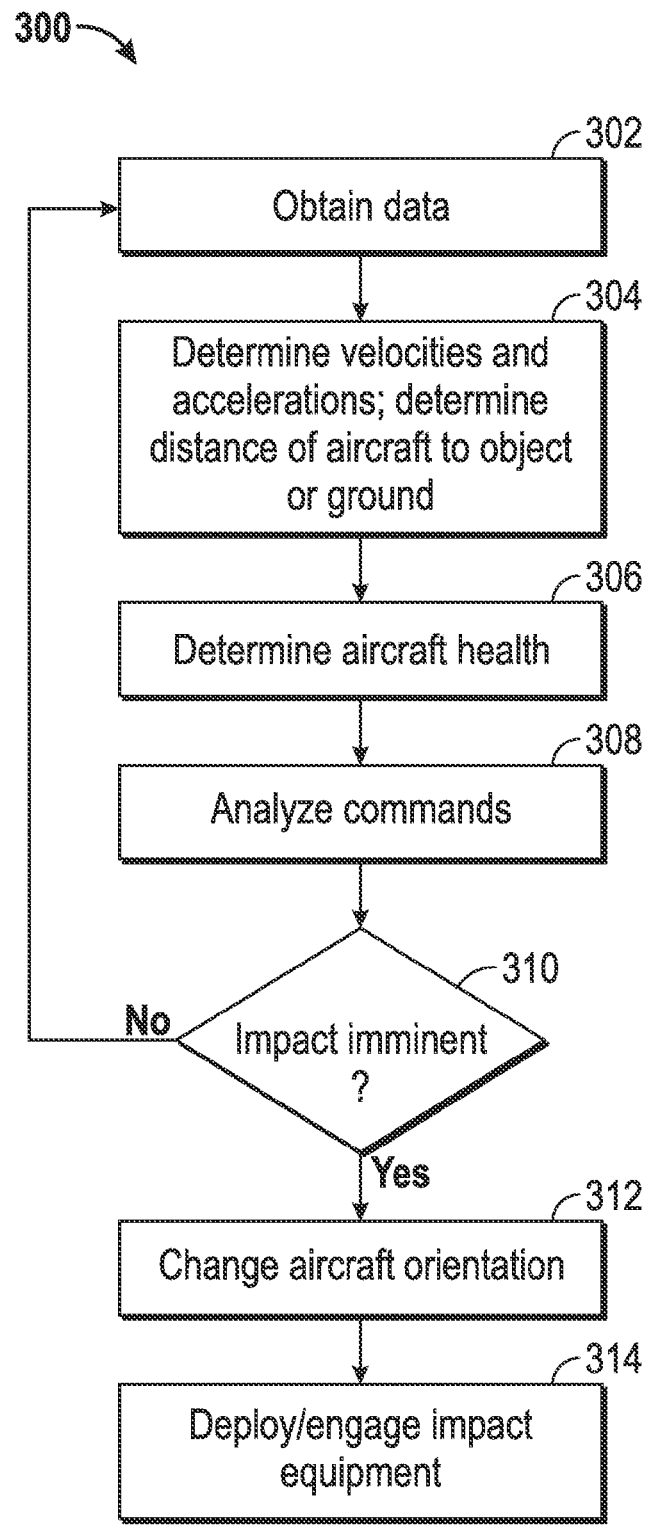
FIG. 3 is a flow chart of an exemplary method in accordance with one or more embodiments of this disclosure.

Turning to FIG. 3, a flow chart of an exemplary method 300 is shown. The method 300 may be executed in connection with one or more components, devices, or systems, such as those described herein. The method 300 may be used to determine whether an aircraft crash or impact is imminent, and if so, may take measures in an effort to minimize the damage that the aircraft might sustain.

In block 302, data may be obtained from one or more sources. For example, in connection with FIG. 2, data may be obtained from the sensor(s) 202, the monitoring system(s) 204, and/or the control computer(s) 206.

Blocks 304-308, described in further detail below, may represent a processing of the data obtained in block 302.

In block 304, a determination may be made regarding what velocities and accelerations are present. In block 304, a determination may be made regarding a distance between the aircraft and an object or the ground. If the determined distance is less than a threshold (which may be a function of the determined velocities and accelerations), a preliminary determination may be made that a crash or impact is imminent.

In block 306, a determination may be made regarding the health of the aircraft. For example, one or more aircraft discretes or discrete signals may be examined to determine if, e.g., one or more systems or sensors are failed or inoperative. If the aircraft, or a portion thereof, is determined to be unhealthy, an adjustment may be made. For example, outputs from a sensor that might otherwise indicate that a crash or impact is imminent might be ignored or weighted less if that sensor has failed or has been rendered inoperative in some way. Alternatively, backup or redundant sensors may be consulted in the event that a primary sensor has failed.

In block 308, one or more commands may be analyzed. For example, commands received from the cockpit or the pilot may be used to compare an intended command output from a command model with what the sensors are indicating is occurring. For example, by making a determination of the pilot's intentions, a false positive may be eliminated in the event that, e.g., the aircraft is flying over the top of a building or over the side of a ship.

In block 310, a determination may be made if a crash or impact is imminent (e.g., a crash or impact is likely to occur with a probability greater than a threshold within a (second) threshold amount of time).

If a crash/impact is deemed not to be imminent in block 310 (e.g., the 'NO' path is taken out of block 310), flow may proceed from block 310 to block 302 to continue obtaining data. In this manner, a loop may be established to continue monitoring the data for an indication that a crash/impact is imminent.

If a crash/impact is deemed to be imminent in block 310 (e.g., the 'YES' path is taken out of block 310), flow may proceed from block 310 to block 312. In block 312, the orientation of the aircraft may change, as necessary, to an optimal terminal attitude, and velocities (e.g., lateral velocities) may be minimized to the fullest extent possible. As part of block 312, one or more stick commands may be generated.

In block 314, one or more items or pieces of equipment may be deployed or engaged in preparation for impact. For example, airbags may be deployed in an effort to minimize any potential damage to the aircraft and to "soften" the effect of the impact on the aircraft (and in turn, any objects or people located within the aircraft).

The operations of blocks 312 and 314 may allow for the aircraft to fully or maximally exploit energy attenuation properties associated with the aircraft. For example, the operations of block 312 may be used to exploit the energy attenuation properties associated with the airframe of the aircraft. One or more thresholds may be used to ensure that any pieces of equipment that could serve to reduce the energy associated with a crash or impact are fully deployed before the crash or impact occurs.

Figure 4:
FIG. 4 is a diagram illustrating an orientation of an aircraft during a crash in accordance with one or more embodiments.

FIG. 4 illustrates an orientation of an aircraft 402 during a crash in accordance with one or more embodiments. As shown in FIG. 4, when the aircraft 402 is in a first position (denoted as position 402-1), the aircraft 402 may determine or detect that a crash or impact is imminent. In response to that determination or detection, the aircraft may engage in one or more adjustments with respect to, e.g., the orientation of the aircraft. Thus, when the aircraft 402 reaches a second position (denoted as position 402-2) at a later point in time that is closer to a point or location 404 of impact, the orientation of the aircraft 402 may be such that any of the energy associated with the impact may be attenuated to the fullest extent possible. The location 404 of impact may coincide with any object, such as the ground, the sea, etc.

Aspects of this disclosure may be applied to any type of aircraft, such as rotary wing aircraft (e.g., a helicopter, cyclocopter, autogyro, gyrodyne, etc.) and fixed-wing aircraft (e.g., an airplane, a seaplane, a glider, etc.). Aspects of the disclosure may be used to minimize the extent of damage that may be sustained by an aircraft in the event that the aircraft crashes.

Embodiments of this disclosure may be tied to one or more particular machines. For example, one or more computers, devices, processors, systems, or architectures may be configured to determine whether a crash or impact of an aircraft is imminent. Such a determination may be made based on data that may be obtained from one or more sources. If a crash/impact is determined to be imminent, measures may be taken to maximize energy attenuation capabilities of the aircraft. For example, the aircraft may be reoriented as necessary.

As described herein, in some embodiments various functions or acts may take place at a given location and/or in connection with the operation of one or more apparatuses, systems, or devices. For example, in some embodiments, a portion of a given function or act may be performed at a first device or location, and the remainder of the function or act may be performed at one or more additional devices or locations.

Embodiments may be implemented using one or more technologies. In some embodiments, an apparatus or system may include one or more processors, and memory storing instructions that, when executed by the one or more processors, cause the apparatus or system to perform one or more methodological acts as described herein. Various mechanical components known to those of skill in the art may be used in some embodiments.

Embodiments may be implemented as one or more apparatuses, systems, and/or methods. In some embodiments, instructions may be stored on one or more computer-readable media, such as a transitory and/or non-transitory computer-readable medium. The instructions, when executed, may cause an entity (e.g., an apparatus or system) to perform one or more methodological acts as described herein.

Aspects of the disclosure have been described in terms of illustrative embodiments thereof. Numerous other embodiments, modifications and variations within the scope and spirit of the appended claims will occur to persons of ordinary skill in the art from a review of this disclosure. For example, one of ordinary skill in the art will appreciate that the steps described in conjunction with the illustrative figures may be performed in other than the recited order, and that one or more steps illustrated may be optional.

What is claimed is:

1. A method comprising:
obtaining, by a device, data associated with an aircraft;
processing, by the device, the data;
determining, by the device, that the aircraft is likely to impact the ground with a probability greater than a threshold within a second threshold amount of time based on the processed data;
causing, by the device, a change in an attitude of the aircraft relative to the ground based on the determination to adjust an impact angle of the aircraft relative to the ground; and
causing, by the device, a lateral velocity associated with the aircraft relative to the ground to be reduced to an amount less than a third threshold based on the determination.

2. The method of claim 1, wherein the data comprises state data, health data, and command model data.

3. The method of claim 1, wherein the determination is based on an analysis of at least one pilot command.

4. The method of claim 1, further comprising:
causing, by the device, impact equipment to be deployed based on the determination.

5. The method of claim 4, wherein the impact equipment comprises an airbag, and wherein the second threshold amount of time is selected such that the airbag is fully deployed prior to the aircraft impacting the object.

6. An apparatus comprising:
at least one processor; and
memory having instructions stored thereon that, when executed by the at least one processor, cause the apparatus to:
process data associated with an aircraft;
determine that the aircraft is likely to impact the ground with a probability greater than a threshold within a second threshold amount of time based on the processed data;
cause a change in an attitude of the aircraft relative to the ground based on the determination to adjust an impact angle of the aircraft relative to the ground; and
cause a lateral velocity associated with the aircraft relative to the ground to be reduced to an amount less than a third threshold based on the determination.

7. The apparatus of claim 6, wherein the data comprises data obtained from at least one sensor.

8. The apparatus of claim 7, wherein the data comprises data associated with the health of the aircraft.

9. The apparatus of claim 8, wherein the data comprises command model data.

10. The apparatus of claim 9, wherein the instructions, when executed by the at least one processor, cause the apparatus to:
compare the command model data to the data obtained from the at least one sensor,
wherein the determination is based on the comparison.

11. A system aboard an aircraft, comprising:
sensors configured to generate state data associated with the aircraft;
at least one monitoring system configured to generate health data associated with the aircraft;
at least one control computer configured to generate command model data associated with the aircraft; and
a processor configured to:
process the state data, the health data, and the command model data,
determine that the aircraft is likely to impact the ground with a probability greater than a threshold within a second threshold amount of time based on the processed data,
cause a change in an attitude of the aircraft relative to the ground based on the determination to adjust an impact angle of the aircraft relative to the ground; and
minimize a lateral velocity associated with the aircraft relative to the ground based on the determination .

12. The system of claim 11, wherein the command model data comprises a pilot control, and wherein the processor is configured to compare the pilot control to the state data to determine that the aircraft is likely impact the ground with the probability greater than the threshold within the second threshold amount of time.

\* \* \* \* \*